(12) United States Patent
Takizawa et al.

(10) Patent No.: US 7,155,670 B2
(45) Date of Patent: Dec. 26, 2006

(54) DOCUMENT AUTHORING SYSTEM AND AUTHORING MANAGEMENT PROGRAM

(75) Inventors: Hiroshi Takizawa, Kodaira (JP); Sachiko Kawanishi, Kokubunji (JP)

(73) Assignees: Internet Disclosure Co., Ltd., Tokyo (JP); Asia Securities Printing Co. Ltd., Tokyo (JP)

( * ) Notice: Subject to any disclaimer, the term of this patent is extended or adjusted under 35 U.S.C. 154(b) by 244 days.

(21) Appl. No.: 10/622,029

(22) Filed: Jul. 17, 2003

(65) Prior Publication Data

US 2004/0019853 A1 Jan. 29, 2004

Related U.S. Application Data

(63) Continuation-in-part of application No. 10/339,106, filed on Jan. 9, 2003, now abandoned.

(30) Foreign Application Priority Data

Jan. 18, 2002 (JP) ............................. 2002-010397
Nov. 25, 2002 (JP) ............................. 2002-340963

(51) Int. Cl.
  *G06F 15/00* (2006.01)
  *G06F 17/00* (2006.01)
(52) U.S. Cl. ...................... 715/523; 715/513; 715/522; 715/526
(58) Field of Classification Search ................ 715/523, 715/511, 513, 526, 522; 707/200, 1; 717/114; 709/204; 714/38; 434/322
See application file for complete search history.

(56) References Cited

U.S. PATENT DOCUMENTS 6,209,124 B1* 3/2001 Vermeire et al. ........... 717/114
6,424,979 B1* 7/2002 Livingston et al. ......... 715/511
6,535,896 B1* 3/2003 Britton et al. .............. 715/523
6,601,057 B1* 7/2003 Underwood et al. ........... 707/1
6,678,867 B1* 1/2004 Fong et al. ................. 715/523
2003/0120686 A1* 6/2003 Kim et al. .................. 707/200
2003/0140316 A1* 7/2003 Lakritz ....................... 715/536
2003/0158897 A1* 8/2003 Ben-Natan et al. ......... 709/204

FOREIGN PATENT DOCUMENTS

WO  WO 01/98927  12/2001

OTHER PUBLICATIONS

Printout of Home Page of Microsoft FrontPage version 2002 of Product and Technology Catalog: (Downloaded on Oct. 31, 2002 from the website of Microsoft Corporation).
Aoki et al., "XML-Based Web Form Processing Framework", Transactions of Symposiums, Information Processing Society 2000:169-174, Jun. 28, 2000.

* cited by examiner

*Primary Examiner*—William Bashore
*Assistant Examiner*—Chau Nguyen
(74) *Attorney, Agent, or Firm*—Fish & Richardson P.C.

(57) ABSTRACT

There is disclosed a document authoring system mainly comprising a server including an authoring management program to prepare a document including tables, and terminals connected via the Internet and including browsing software (browser). The authoring management program comprises a data management function portion which interprets instruction data concerning change/addition sent from these terminals and attaches a unique identification number to the data, an editing management function portion (DOM of XML) which adds/changes XML format data by a request from the terminal, a data conversion function portion (XSLT, CSS, XML parser) which converts the XML format data into HTML format data, a script tool (script group) which supplies an auxiliary operation function to the terminal, and a publication function portion (Web browser, server program) which publicates the HTML format data on the Internet in an accessible mode.

8 Claims, 25 Drawing Sheets

| Password | | Edits Main menu | | Log out |

Selected [ ××××× ] ABC Corporation 3/31/2001 Annual report ▶

1. Edit
2. Output
   ○ Report preparation
   ○ Check list
3. Control
   ○ Documents status Customer's information

| Company's name | ABC Corporation |
| Industry | Electronics |
| Consolidation | Yes |
| Year end | March 31 |
| Unit | Thousands of Yen |

FIG. 4

Selected "ABC Corporation" and "Annual report" at main menu

ABC Corporation
Annual report

[Edit index]

| View | Input | Format | Add/Del | Update |

Click documents title

| View Change | Menu | Log out |

Cover
Company information
1 Company outline
   1. Financial data highlights
      (1) Highlights - consolidayion
      (2) Gihlights - parent company
   2. History
   3. Business contents
   4. Affiliated companies
   5. Employees
2 Business
   1. Outline
   2. Production, order and sales
   3. Company's target
   4. Material contracts
   5. Research and development

FIG. 5A

Selected "Trend of stock price" in index pane

ABC Corporation
Annual report

Edit index

Cover
Company information
1 Company outline
  1. Financial data highlights
    (1) Highlights - consolidation
    (2) Gihlights - parent company
  2. History
  3. Business contents
  4. Affiliated companies
  5. Employees
   .
   .
  2. Treasury stock
  3. Dividends policy
  4. Trend of stock price ← Selected

| View | Input | Format | Add/Del | Update |

4. Trend of stock price

| Month | April, 2001 | May | June | July |
|-------|-------------|-----|------|------|
| High  |             |     |      |      |
| Low   |             |     |      |      |

Note stock price was quoted from Tokyo Stock exchange.

| View Change | Menu | Log out |

FIG. 5B

Input mode
Input-field is shown in the table.

ABC Corporation
Annual report
[Edit index]

Cover
Company information

1 Company outline
  1. Financial data highlights
    (1) Highlights - consolidation
    (2) Gihlights - parent company
  2. History
  3. Business contents
  4. Affiliated companies
  5. Employees
    .
    .
  2. Treasury stock
  3. Dividends policy
  4. Trend of stock price

| View | Input | Format | Add/Del | Update |

4. Trend of stock price

| Month | April, 2001 | May | June | July |
|---|---|---|---|---|
| High | | | | |
| Low | | | | |

Note <u>Stock price was quoted from Tokyo Stock exchange.</u>

| View Change | Menu | Log out |

Sub-window to edit text is shown
when the targer text was clicked

FIG. 6A

Sub-window to edit text

FIG. 7A

ABC Corporation
Annual report

[Edit index]

Cover
Company information
1 Company outline
  1.Financial data highlights
    (1)Highlights – consolidation
    (2)Gihlights – parent company
  2.History
  3.Business contents
  4.Affiliated companies
  5.Employees
   . .
  2.Treasury stock
  3.Dividends policy
  4.Trend of stock price

| View | Input | Format | Add/Del | Update |

4.Trend of stock price

| Month | April,2001 | May | June | July |
| High  |            |     |      |      |
| Low   |            |     |      |      |

Note  Stock price was quoted from Tokyo Stock exchange.

Green pin    Represents document
Orange pin   Represents table
Yellow pin   Represents column
Blue pin     Represents row
Gray pin     Represents cell Every object has graphical pin under format mode as follows

| View Change | Menu | Log out |

Consistency check List

| Title | Documents | | | | | Counter documents | | | | | Method | Difference |
|---|---|---|---|---|---|---|---|---|---|---|---|---|
| | Period | Accounts | Amount | Unit | Title | Period | Accounts | Amount | Unit | Title | | |
| Highlights-con. | Previous | Sales | 126,500 | Thousands Yen | Income statement | Previous | Sales | 126,500 | Thousands Yen | = | 0 |
| Highlights-con. | Current | Sales | 158,200 | Thousands Yen | Income statement | Current | Sales | 158,200 | Thousands Yen | = | 0 |
| Highlights-con. | Previous | Ordinary profit | 12,600 | Thousands Yen | Income statement | Previous | Ordinary profit | 12,600 | Thousands Yen | = | 0 |
| Highlights-con. | Current | Ordinary profit | 24,800 | Thousands Yen | Income statement | Current | Ordinary profit | 24,800 | Thousands Yen | = | 0 |
| Highlights-con. | Previous | Net income | 1,100 | Thousands Yen | Income statement | Previous | Net income | 1,100 | Thousands Yen | = | 0 |
| Highlights-con. | Current | Net income | 1,800 | Thousands Yen | Income statement | Current | Net income | 1,800 | Thousands Yen | = | 0 |
| Highlights-con. | Previous | Net assets | 68,512 | Thousands Yen | Income statement | Previous | Net assets | 68,512 | Thousands Yen | = | 0 |
| Highlights-con. | Current | Net assets | 79,658 | Thousands Yen | Income statement | Current | Net assets | 79,658 | Thousands Yen | = | 0 |
| Highlights-con. | Previous | Total assets | 135,680 | Thousands Yen | Income statement | Previous | Total assets | 135,680 | Thousands Yen | = | 0 |
| Highlights-con. | Current | Total assets | 143,250 | Thousands Yen | Income statement | Current | Total assets | 143,250 | Thousands Yen | = | 0 |
| Highlights-con. | Previous | Equity ratio | 50% | % | Balance sheet | Previous | Equity ratio | 50% | % | = | 0 |
| Highlights-con. | Current | Equity ratio | 56% | % | Balance sheet | Current | Equity ratio | 56% | % | = | 0 |

FIG. 8

Previous period    Year ended at March31, 2001

1. Finance lease transaction other than ownership transfer was recognized (1) Equivalents to acquisition cost, accumulated depreciation and year-end balance (millions yen)

| | Equivalents to | | |
|---|---|---|---|
| | Acquisition cost | Accumulated depreciation | Year-end balance |
| Machinery and Vehicles | 3,262 | 1,767 | 1,699 |
| Tools and equipment | 2,596 | 1,337 | 1,261 |
| Others | 762 | 412 | 339 |
| Total | 6,620 | 3,327 | 3,298 |

Note) Equivalents to acquisition cost is computed by interest inclusion method due to low materiality (2) Equivalents to year-end balance of accrued lease payable Current    1,174 Millions yen
Over 1 year    2,124 Millions yen
total    3,298

Previous period    Year ended at March31, 2002

1. Finance lease transaction other than ownership transfer recognized (1) Equivalents to acquisition cost, accumulated depreciation and year-end balance (millions yen)

| | Equivalents to | | |
|---|---|---|---|
| | Acquisition cost | Accumulated depreciation | Year-end balance |
| Machinery and Vehicles | 3,914 | 1,880 | 2,039 |
| Tools and equipment | 3,115 | 1,604 | 1,513 |
| Others | 914 | 507 | 407 |
| Total | 7,944 | 3,992 | 3,298 |

Note) Equivalents to acquisition cost is computed by interest inclusion method due to low materiality (2) Equivalents to year-end balance of accrued lease payable Current    1,409 Millions yen
Over 1 year    2,548 Millions yen
total    3,298

Equivalents to year-end balance

FIG. 9A

| | |
|---|---|
| Lease payments 1,388 Millions yen | Lease payments 1,388 Millions yen |
| Equivalents to accumulated 1,388 Millions yen | Equivalents to accumulated 1,665 Millions yen |
| (4) Computation method of equivalents to depreciation | (4) Computation method of equivalents to depreciation |
| Based on straight line method. | Based on straight line method. |
| 2. Operationg lease transaction | 2. Operationg lease transaction |
| Accrued lease payable | Accrued lease payable |
| Current 196 Millions yen | Current 234 Millions yen |
| Over 1 year 196 Millions yen | Over 1 year 235 Millions yen |
| Total 392 | Total 469 |

FIG. 9B

| | Accounts | Previous period | Current period |
|---|---|---|---|
| 21 | Current asstes | 3,700 | 4,440 |
| | Cash and deposits | 1,200 | 1,600 |
| | Accounts receivable-trade | 2,500 | 2,800 |
| 22 | Fixed assets | 5,290 | 4,800 |
| 23 | Tangible fixed assets | 2,180 | 2,050 |
| | Machinery | 800 | 750 |
| 24 | Buildings and structures | 1,380 | 1,300 |
| | Intangible fixed assets | 1,060 | 1,000 |
| | Telephone rights | 200 | 200 |
| | Software | 800 | 800 |
| | Investments and other | 2,050 | 1,750 |
| | Investment securities | 950 | 950 |
| | Long-term loan receivable | 1,100 | 800 |
| 25 | Deferred assets | 700 | 630 |
| | Stock issuance expenses | 200 | 180 |
| 26 | Business commencement | 500 | 450 |

FIG. 10

|  | Current period | | | | | |
|---|---|---|---|---|---|---|
|  | Communication | Machinery | Others | Total | EJE | Consolidation |
| I. Sales and operating profit | | | | | | |
| Sales | | | | | | |
| (1) Sales to customers | 375,048 | 372,649 | 275,871 | 1,023,568 | 0 | 1,023,568 |
| (2) Internal sales or transfer | 14,019 | 61 | 22,034 | 36,114 | −41,715 | −5,601 |
| Total | 389,067 | 372,710 | 297,905 | 1,059,682 | −41,715 | 1,017,967 |
| Operating expenses | 375,282 | 359,127 | 276,080 | 1,010,489 | −41,677 | 8,888,888 |
| Operating profit (loss) | 13,785 | 13,583 | 21,825 | 49,193 | −38 | 49,155 |
| II. Total assets, depreciation and capital expenditure | | | | | | |
| Total assets | 374,460 | 169,444 | 272,617 | 816,521 | 204,759 | 1,021,280 |
| Depreciation | 27,353 | 5,896 | 17,435 | 50,684 | 1,961 | 52,645 |
| Capital expenditure | 26,572 | 6,273 | 23,395 | 56,240 | 4,163 | 60,403 |

FIG. 11A

| I. Sales and operating profit | Communication | Machinery | Others | Current period As of March 31, 2001 Total | EJE | Consolidation | Connection |
|---|---|---|---|---|---|---|---|
| Sales | | | | | | | |
| (1) Sales to customers | 375,048 | 372,649 | 148,277 | 275,871 | 1,171,845 | 0 | 1,171,845 |
| (2) Internal sales or transfer | 14,019 | 61 | 5,601 | 22,034 | 41,715 | −41,715 | 0 |
| Total | 389,067 | 372,710 | 153,878 | 297,905 | 1,213,560 | −41,715 | 1,171,845 |
| Operating expenses | 375,282 | 359,127 | 151,797 | 276,080 | 1,162,286 | −41,677 | 8,888,888 |
| Operating profit (loss) | 13,785 | 13,583 | 2,081 | 21,825 | 51,274 | −38 | 51,236 |
| II. Total assets, depreciation and capital expenditure | | | | | | | |
| Total assets | 374,460 | 169,444 | 163,969 | 272,617 | 980,490 | 204,759 | 1,185,249 |
| Depreciation | 27,353 | 5,896 | 11,200 | 17,435 | 61,884 | 1,961 | 63,845 |
| Capital expenditure | 26,572 | 6,273 | 10,058 | 23,395 | 66,298 | 4,163 | 70,461 |

FIG. 11B

Before cell merge
FIG. 12A
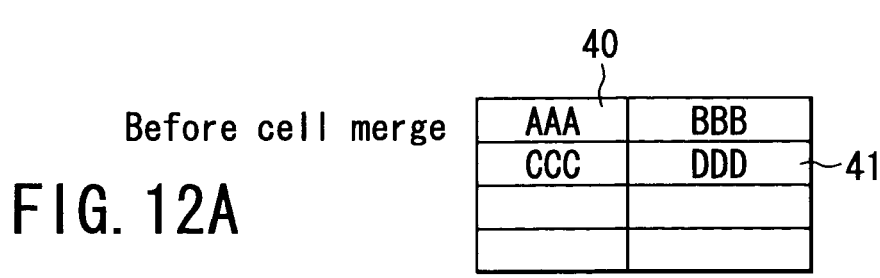
After cell merge
FIG. 12B
Before cell merge
FIG. 13A
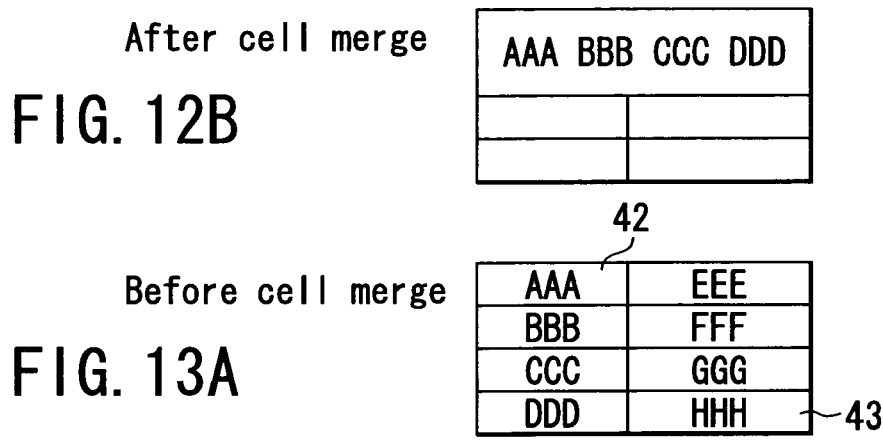
After cell merge
FIG. 13B
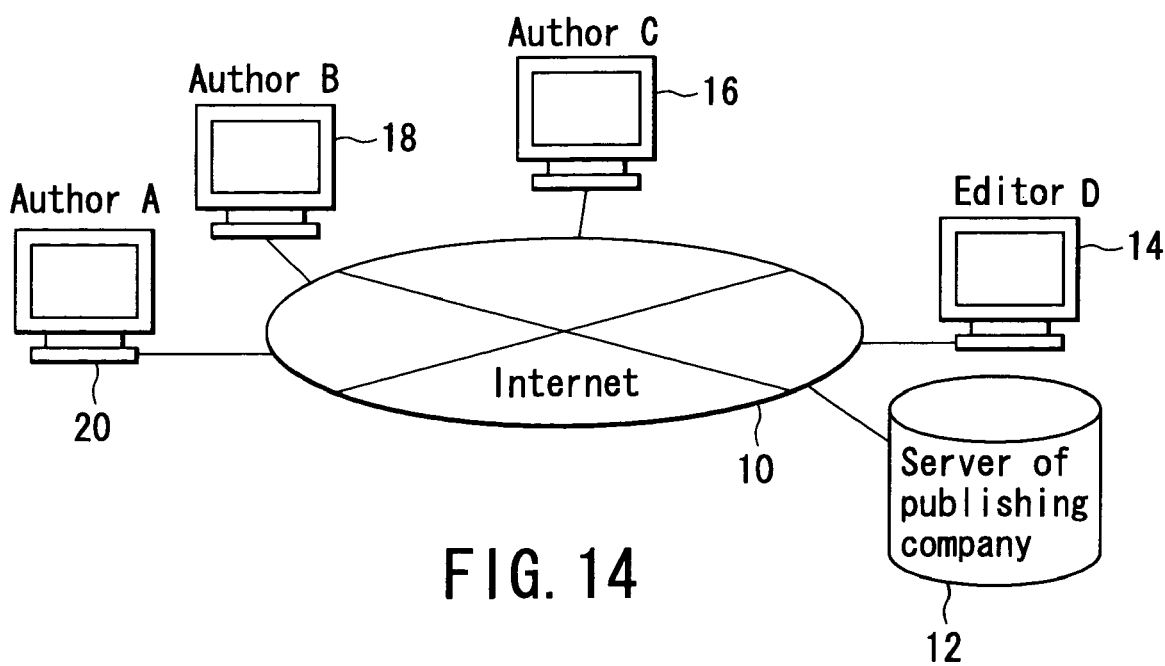
FIG. 14

| View | Input | Format | Add/Del | Update |

Chap2 Financial statements

Financial statements is composed of balance sheets, income statement and cash flow statements.

〈Balance sheets – sample〉

| Assets | | Liabilities·Equity | |
|---|---|---|---|
| Current assets | | Current liabilities | |
| Cash | 100,000 | Accounts payable | 356,000 |
| Securities | 25,000 | Borrowings | 500,000 |
| Accounts receivable | 300,000 | Deposit | 3,000 |
| Inventories | 450,000 | · · | · · |
| · · | · · | | |
| Total | 2,560,000 | Total | 2,560,000 |

〈Elementary accounting〉

Chap1 What is accounting ?
  Sec1 Start of accounting
  Sec2 Double accounting
  Sec3 Profit
Chap2 Financial statements
Chap3 Cash flow
Chap4 Analysis
· · · · · ·

FIG. 15A

<Elementary accounting>

Chap1 What is accounting?
  Sec1 Start of accounting
  Sec2 Double accounting
  Sec3 Profit
Chap2 Financial statements
Chap3 Cash flow
Chap4 Analysis
. . . . . . .

| View | Input | Format | Add/Del | Update |

Chap2 Financial statements

Financial statements is composed of balance sheets, income statement and cash flow statements.

<Balance sheets - sample>

| Assets | | Liabilities·Equity | |
|---|---|---|---|
| Current assets | | Current liabilities | |
| Cash | 100,000 | Accounts payable | 356,000 |
| Securities | 25,000 | Borrowings | 500,000 |
| Accounts receivable | 300,000 | Deposit | 3,000 |
| Inventories | 450,000 | . | . |
| . | . | . | . |
| . | . | . | . |
| Total | 2,560,000 | Total | 2,560,000 |

FIG. 15B

| View | Input | Format | Add/Del | Update |

Chap2 Financial statements

Financial statements is composed of balance sheets, income statement and cash flow statements.

<Balance sheets – sample>

| Assets | | Liabilities·Equity | |
|---|---|---|---|
| Current assets | | Current liabilities | |
| Cash | 100,000 | Accounts payable | 356,000 |
| Securities | 25,000 | Borrowings | 500,000 |
| Accounts receivable | 300,000 | Deposit | 3,000 |
| Inventories | 450,000 | . | . |
| . | . | . | . |
| . | . | . | . |
| . | . | . | . |
| Total | 2,560,000 | Total | 2,560,000 |

<Elementary accounting>

Chap1 What is accounting ?
Sec1 Start of accounting
Sec2 Double accounting
Sec3 Profit
Chap2 Financial statements
Chap3 Cash flow
Chap4 Analysis
. . . . . . .

FIG. 16B

| View | Input | Format | Add/Del | Update |

Estimate 1

Estimate sheet

XXXXX Co., Ltd.
Mr. XXXXX

ABC Corporation

Our estimation is as follows

| Description | Quantity | Unit price | Amount |
|---|---|---|---|
| | | | |
| | | | |
| | | | |

Sub total
Sales tax
Total

Estimate sheet
   Estimate 1
   Estimate 2
   Estimate 3
Order sheet
Invoice
Receipt

Estimate sheet
 Estimate 1
 Estimate 2
 Estimate 3
Order sheet
Invoice
Receipt

| View | Input | Format | Add/Del | Update |

Estimate 1

XXXXX Co., Ltd.
Mr. XXXXX

Estimate sheet

ABC Corporation

Our estimation is as follows

| Description | Quantity | Unit price | Amount |
|---|---|---|---|
|  |  |  |  |
|  |  |  |  |
|  |  |  |  |
|  |  |  |  |
|  |  |  |  |
|  |  | Sub total |  |
|  |  | Sales tax |  |
|  |  | Total |  |

DOCUMENT AUTHORING SYSTEM AND AUTHORING MANAGEMENT PROGRAM

CROSS-REFERENCE TO RELATED APPLICATIONS

This is a Continuation-in-Part application of U.S. patent application Ser. No. 10/339,106, filed Jan. 9, 2003, now abandoned, the entire contents of which are incorporated herein by reference.

This application is based upon and claims the benefit of priority from the prior Japanese Patent Applications No. 2002-010397, filed Jan. 18, 2002; and No. 2002-340963, filed Nov. 25, 2002, the entire contents of both of which are incorporated herein by reference.

BACKGROUND OF THE INVENTION

1. Field of the Invention

The present invention relates to an authoring technique, for example, of a disclosure document, particularly to a document authoring system in which a browser (the Internet browsing software) is used to automatically author a document and the document can be accessed as a web page, and an authoring management program for the system.

2. Description of Related Art

In general, for example, to prepare financial data related disclosure documents, or to prepare requested documents for filing by public companies, the documents have heretofore been prepared using word processor software, particularly "Word" by Microsoft Co., Ltd. Moreover, to prepare financial data related disclosure documents using Word, a template function disposed in Word has been used to locally perform a preparation operation.

On the other hand, a technique of freely using the Internet to present the documents has been introduced. For example, "an electronic disclosure system concerning disclosure documents such as securities reports based on the securities transaction law in Japan (hereinafter abbreviated as "EDI-NET")" has been introduced as of Jun. 1, 2001. In EDINET like EDGAR system in United States, HTML format has been determined as the file format of documents to be handled in order to change the related-art document filing by paper media to a mode of electronic document filing by the Internet.

Moreover, even a typical securities report is obliged to be filed in HTML format (additionally, an essential condition is that the report can be displayed in a browser). Therefore, document filing has heretofore used a method comprising: first preparing a draft by word processor software; and converting the data into HTML format in a final stage in which the draft is completed.

However, it has heretofore been impossible to prepare or display the draft in the browser. The reason is as follows. It is first necessary to map data input from a client in a database on a server so that editing is possible in the browser. Additionally, it has heretofore been possible to map the data input into the database from the browser, but it has been necessary to prepare fields for input beforehand. For example, when a registration button in a member registration web page is clicked, the data is disposed in the database on the server owned by an Internet service provider.

However, in the above-described method of preparing the field for input beforehand, the data cannot be freely edited/laid out as in a word processor. This is insufficient for preparing a financial data related disclosure document such as a securities report as a first object of the present invention.

In actuality, when it is requested to change the arrangement "document A/document B/image C/table D" in a part of the securities report to the arrangement "document A/table D/image C/document B", it is indispensable to designate "where" to prepare "what" in order to freely edit/lay out the data as in a word processor. For details, "to insert the table after this sentence" or "to insert the sentence before this table" is concretely designated. That is, a mechanism in which "this sentence", "this table", or "this image" is designated in the browser is necessary. Furthermore, there has heretofore not been a mechanism to designate or select an object item of the corresponding document for the purpose of editing in the browser.

In general, when a Word template is used to prepare financial data related disclosure documents as described above, there is much laborious input work. Moreover, it has been impossible to check consistency of the financial related document with the Word template. For a financial data related disclosure document, in a securities report prepared based on the securities transaction law in Japan, filing in HTML format is accepted. However, in most of presently performed operation examples, there is no method other than that of preparing the document by word processor software and subsequently performing a batch conversion into HTML format.

In disadvantages of an input method by the word processor software as the related-art method, a final finish in HTML format cannot easily be confirmed, for example, in a visual manner, and it is not guaranteed that the data of the HTML format output by the batch conversion can appropriately be displayed in a web browser, or the converted data in HTML format does not have a simple structure of HTML format. In actual situations, there are many disadvantageous examples. Furthermore, even for an error of an input operation in an input item requiring consistency, there has been no means for automatically finding the error.

As described above, in the related-art document preparation method, there is a necessity of performing conversion to a data file in HTML format, and it is impossible to confirm the displayed state of the finally filed document. Additionally, the filed document, such as a securities report, has a considerably high technicality, and is additionally revised frequently under the disclosure rule. Therefore, it is very difficult to rapidly and correctly prepare the document. Moreover, since the data of filed documents such as securities reports has high correlation, it takes much time to verify the consistency.

Moreover, a plurality of departments in a filing company, an accounting auditor of the filing company, and a large number of parties concerned, such as a printing company, are involved in the preparation of the filed documents such as the securities reports. These parties concerned are not necessarily in the same workplace, and generally communicate with one another via facsimile or mail to proceed with the preparing/proofreading/editing of the predetermined document. This work requires due attention.

As described above, in the related-art method, display in HTML format as a final formal filing format cannot be confirmed. To confirm the display, data conversion processing has to be performed for each confirmation. On the other hand, it is not guaranteed that the converted document can correctly be displayed in a browser (the Internet browsing software). Because of these disadvantages, usability is remarkably degraded.

Therefore, it can be said that "to prepare a document required to be displayed in a browser by using a browser" is a most rational method as a solution of the disadvantages.

BRIEF SUMMARY OF THE INVENTION

An object of the present invention is to provide a document authoring system in which a browser is used to easily prepare a desired related disclosure document and the document can be accessed as a Web page, and an authoring management program for the system.

To solve the above-described disadvantages and achieve the object, according to the present invention, the following means is taken in order to realize a filing document authoring system, for example, for EDINET using the Internet. That is, according to a first aspect of the present invention, there is provided a document authoring system comprising: a server including an authoring management program to prepare a document including tables; and a client terminal (i.e., a terminal device) connected to the server via a predetermined network. Moreover, the authoring management program comprises functions of: editing means for editing data in response to a request from the client terminal; conversion means for converting data in XML format to data in HTML format; and publishing means for releasing the data in HTML format onto the network in an accessible format.

According to a second aspect of the present invention, there is provided an authoring management program which is operated in a document authoring system comprising: a server; and a client terminal connected to the server via a predetermined network so as to prepare a document including tables, the program comprising an order statement which allows a resource (computer) to execute: an editing step of editing data in response to a request from the client terminal; a first conversion step of converting data edited by the editing step into XML format; a second conversion step of converting the XML format data converted by the first conversion step into HTML format data; and a publication step of releasing the HTML format data converted by the second conversion step onto the network in an accessible format and a displayable file format.

Moreover, according to a third aspect of the present invention, there is provided a document authoring system comprising: a server including an authoring management program in which a predetermined program is used to prepare a document including tables; and a client terminal connected to the server via the Internet in an accessible manner. Moreover, the authoring management program can be constructed to drive the program comprising: a data management function portion which interprets output data as a change command from the server, attaches individual identification numbers to the data, specifies a part of the document to be edited based on the identification number, and updates the XML document to manage information in the document authoring system in a one-dimensional manner; an editing management function portion which edits document data (XML) based on predetermined information input from the client terminal via the server; a data conversion function portion (XSLT, CSS) which converts the data format for use in the client terminal so as to match the data format with the format of the document data; and a script function portion which supplies an input support function related with the document editing to the client terminal.

According to the document authoring system proposed/provided by the present invention, parties concerned including a client use the file in a shared mode via the Internet, and browse the related disclosure documents such as a disclosure document for EDINET in HTML format, so that the client can prepare and edit the document as desired. Therefore, operation efficiency of the document preparation can be enhanced.

BRIEF DESCRIPTION OF THE SEVERAL VIEWS OF THE DRAWING

FIG. 4 is an explanatory view showing one example of a main menu screen displayed in a terminal device in the system (EDITS) according to the embodiment;

FIGS. 5A, 5B show changes of the display screen concerning a certain company, following a main menu, FIG. 5A is an explanatory view showing a list of contents and start screen, and FIG. 5B is an explanatory view showing a screen in selecting "transition of stock price" from the list of contents;

FIGS. 6A, 6B show an input mode time, FIG. 6A is an explanatory view showing a screen in an input mode, and FIG. 6B is an explanatory view showing a sub window further displayed as a text editing dialog in the right of the screen;

FIGS. 7A, 7B shows a case in which a "format setting" mode is operated, FIG. 7A shows a screen layout displaying an image display symbol which can be clicked, and FIG. 7B shows a screen layout showing dialog for the "format setting";

FIG. 8 is a consistency check table as a result of consistency check concerning data from a filing document data database;

FIGS. 9A, 9B show examples (Table Example 1: display image) of a table in HTML format prepared by the system;

FIG. 10 shows an example (Table Example 2: image display symbol) of the table showing a part of the document prepared by the system;

FIGS. 11A, 11B show examples of the table in a case in which a row or column is inserted into the table example prepared by the system (Table Example 3: image display symbol);

FIGS. 12A, 12B are explanatory views showing one example of editing according to the embodiment in which four cells are combined;

FIGS. 13A, 13B are explanatory views showing another example of editing according to the embodiment in which eight cells are combined;

FIG. 14 is a system constitution diagram showing a constitution as Modification Example 1 in which the present invention is applied to preparation and editing of "newspaper, book, and magazine";

FIGS. 15A, 15B show changes of the screen in Modification Example 1, FIG. 15A shows a screen layout of a "view" mode of the system, and FIG. 15B shows a screen layout at a change time to an "input" mode;

FIGS. 16A, 16B show display screens in Modification Example 1, FIG. 16A shows a screen layout of the sub window as the text editing dialog, and FIG. 16B shows a screen layout including the image display system which can be clicked in a changed "addition/deletion" mode;

FIGS. 18A, 18B show the changes of the screen in Modification Example 2, FIG. 18A shows the screen layout of the "view" mode of the system, and FIG. 18B shows the screen layout at the change time to the "input" mode;

FIGS. 19A, 19B show the display screens in Modification Example 2, FIG. 19A shows a screen layout of the sub window as the text editing dialog, and FIG. 19B shows the screen layout including the image display system which can be clicked in the changed "addition/deletion" mode.

DETAILED DESCRIPTION OF THE INVENTION

Figure 1:
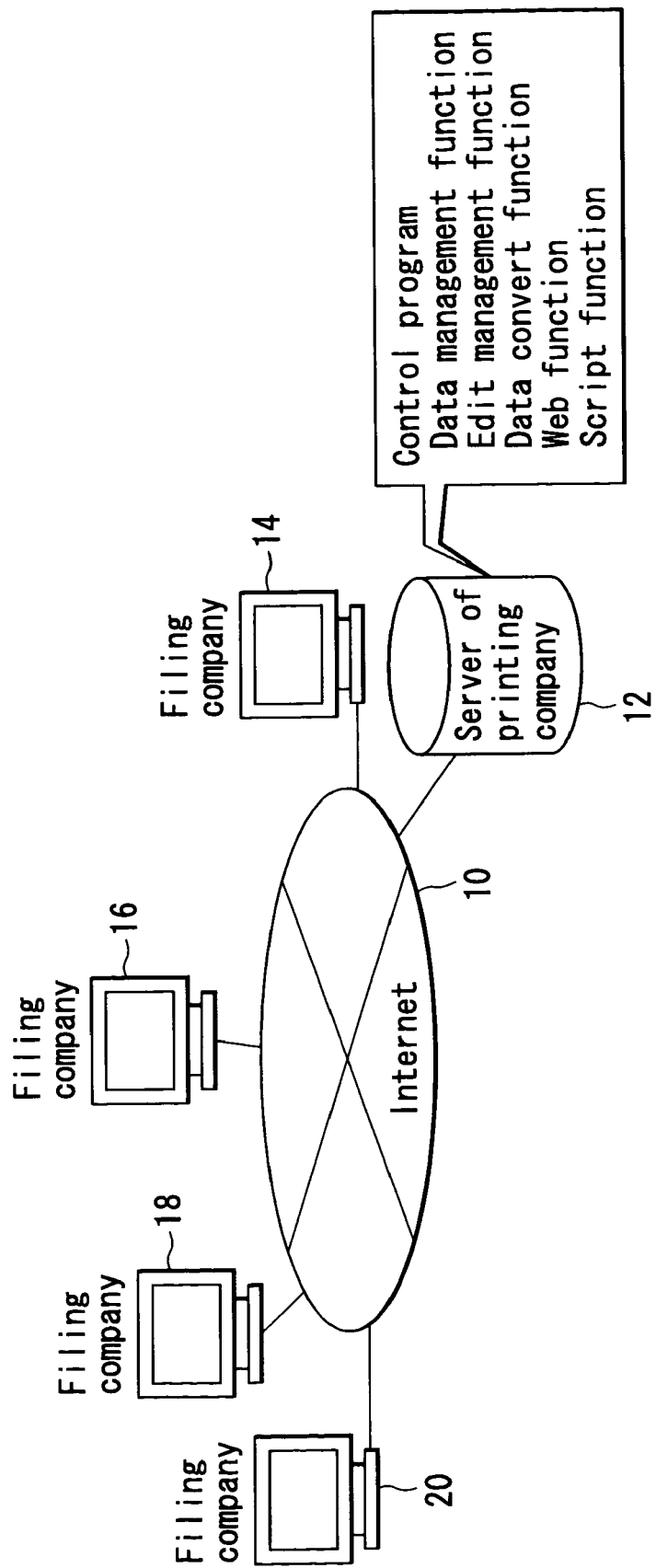
FIG. 1 is a system constitution diagram showing the whole outline of a document authoring system according to an embodiment of the present invention.

Embodiments of the present invention will be described hereinafter with reference to the accompanying drawings. As a concrete description, for a document to be handled herein, for example, a document for EDINET filing which a public company in Japan is requested to prepare will be described as one example. A document authoring system for using a network, particularly the Internet to prepare the document for filing, and an authoring management program will be described.

At present, the Financial Service Agency in Japan has actually announced preparation requirements of the EDINET filing document as follows. That is, the following document editing software can be used to prepare an HTML format document:

I. a word processor which has an HTML output function;
II. an HTML editor; and
III. a text editor.

Moreover, the conventional preparation of the filing document for EDINET is performed in the above method "I" as follows:

1. the word processor is used to prepare the document for EDINET filing; and
2. an HTML file preparation function disposed in the word processor is used to convert a file format unique to the word processor into HTML file format.

In the operation based on this method, a client confirms appearance of the EDINET document on the word processor, and thereafter prepares filing data.

Additionally, the Financial Service Agency in Japan defines the preparation of the HTML format document by the HTML editor or text editor as the above method "II", "III". However, in the present situation, an operation mode in which the document is prepared by these methods has not been seen.

Therefore, the document authoring system of the present invention satisfying the following function requirements is implemented:

the related disclosure documents such as the document for EDINET filing is prepared and edited in cooperation on the Internet;
the XML data format on the server is updated by the HTML data format edited by the browser;
preparation guidance is displayed in accordance with the document as an editing object; and
since the data is held in XML format, it is possible to verify consistency among associated numeric value items.

That is, the document authoring system includes a function of displaying an associated ground provision or preparation example as guidance in accordance with a prepared position during document preparation or editing, and is easy to use. Additionally, for major data, the system includes a function of automatically verifying whether or not the consistency is kept among numeric values.

A major constituting resource of the system is constituted by a plurality of terminal devices (hereinafter referred to simply as "terminals") and a server connected to the Internet, a database, and various types of software or tools.

As an assumption of operation environments described above, for the terminal device on a user side, only a browser which can make an output in HTML format and in which a script sent together with the document in HTML format from the server can operate is sufficient.

It is to be noted that to send the information to the user-side terminal from the server side, the data conversion function to HTML format from XML format is performed by XML conversion means (XSLT, CSS).

Conversely, when the client changes the document, the data conversion into XML format from HTML format is performed.

The document authoring system of the present invention is a system which can realize free editing or layout of sentences including tables or images as in a word processor in the browser.

The document authoring system will concretely be described hereinafter by means of embodiments and modification examples with reference to FIGS. 1 to 20.

FIG. 1 shows the outline of the whole document authoring system as one embodiment. This document authoring system is based on one assumption that the system can be operated for a plurality of users who have concluded a predetermined contract to participate as clients and to use a function provided by a certain service provider company, for example, via the Internet 10.

As the provided function, the user (hereinafter referred to as the "client") can prepare a desired document on the Web. On the other hand, the client includes a company which needs to present the document to predetermined destinations such as a government agency, a so-called "document filing company".

Therefore, as shown, for the service provider company which provides this function, a server 12 including a large number of database (not shown), and a terminal device 14 connected to the server also via LAN are constituted so that the Internet 10 can be connected. Moreover, for a company (i.e., the document filing company) obliged to present documents desired by the client such as a "financial related disclosure document", terminal devices (hereinafter referred to also as "client terminals") 16, 18, 20 for exclusive use in administration and accounting divisions are connected to the Internet 10.

It is to be noted that examples of the above-described financial data related disclosure document concretely include SEC filings like Form 10-K a securities report, brief announcement of the most recent financial statement following the end of the fiscal year, business law calculation documents, shareholder's general meeting call-up notice, account settlement publication, tax declaration, semiannual report, brief announcement of semiannual financial settlement of accounts, interim return form, brief announcement of quarterly settlement, securities notification, issuance registration form, securities notice, correction report, prospectus, incidental report, self stock certificate purchase situation report, tender notification, tender report, large amount holder report, and report for registration application at an application time for going public.

The service provider company (hereinafter referred to as the "provider company") concludes a prior contract to permit an access equivalent to that to the terminal device 14 from a plurality of client terminals 16, 18, 20 as document filing companies with respect to the server 12 (i.e., a service provider company database) connected to the Internet 10.

A control program (authoring management program: described later in detail) as the "document authoring system" according to the present embodiment is constantly stored in the server 12, and is set to be constantly in an accessible state from the client terminals 16, 18, 20 via the Internet 10.

In the server 12, the following various types of databases (database) and software are prepared:

ID provided to the document filing company (client), ID holding a password, and password database;
processing software for the client (such as program for data input in the browser);
document filing company (client) data (for details, database of the XML format);
authoring management program (control program on a server side: object-oriented language);
style definition date for HTML or XML (e.g., cascading style-sheets (CSS), extensible style-sheets language (XSL);
conversion program for converting the XML format into the HTML format (e.g., XSLT (XSL transformation), and the like);
update processing program (software for editing: object-oriented language);
guidance data database corresponding to the XML data (e.g., ground provision and preparation example data); and
consistency table database concerning major numeric value data.

That is, the document authoring system of the present invention is constituted of the server 12, and the terminals 14, 16, 18, 20 which are connected to the server 12 via the Internet 10 and which have an output function, for example, of HTML format data in a hardware manner.

Figure 2:
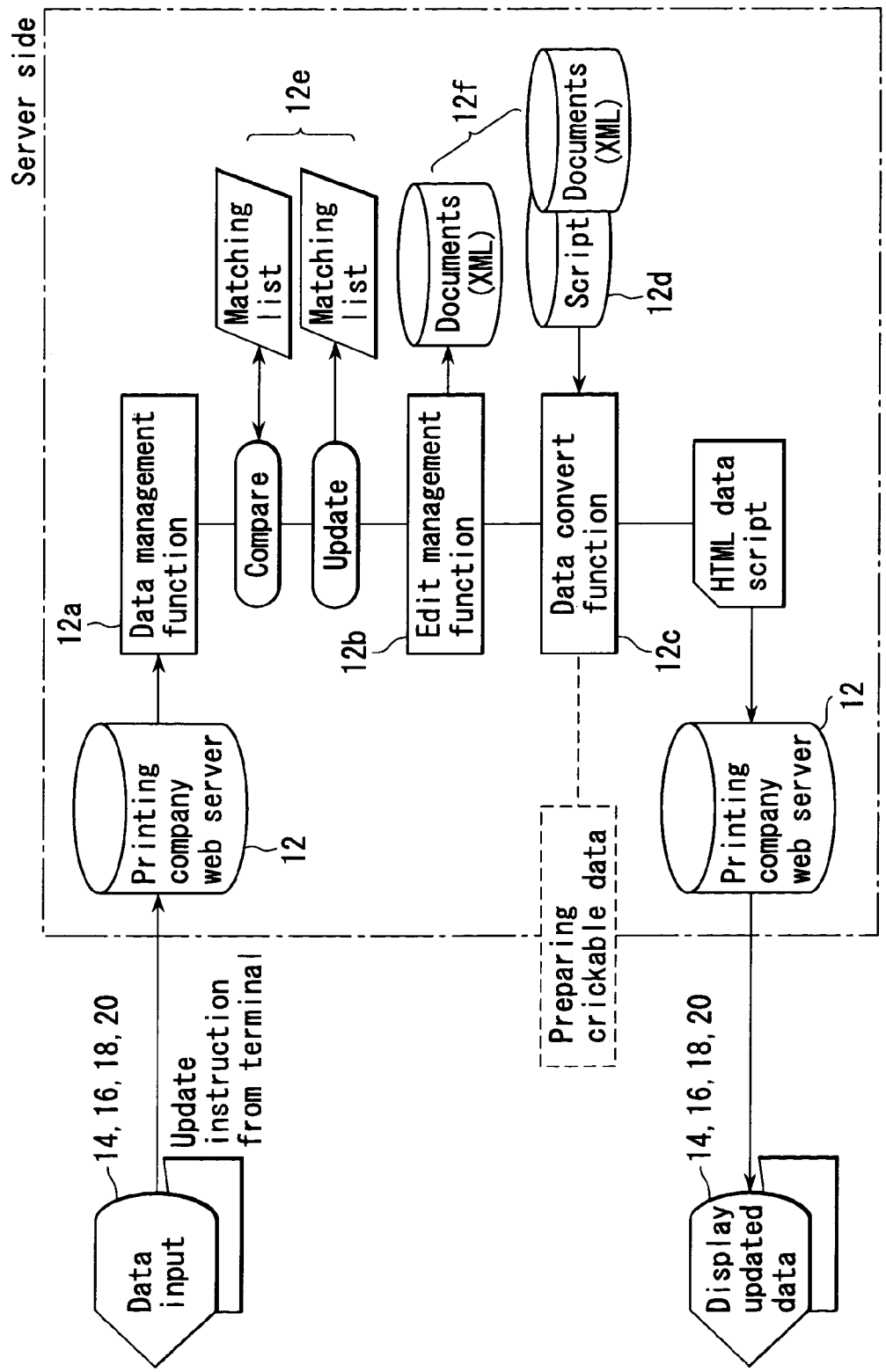
FIG. 2 is an explanatory view showing a major function constitution related with the document authoring system and a flow of processing data by these functions.
Figure 3A:
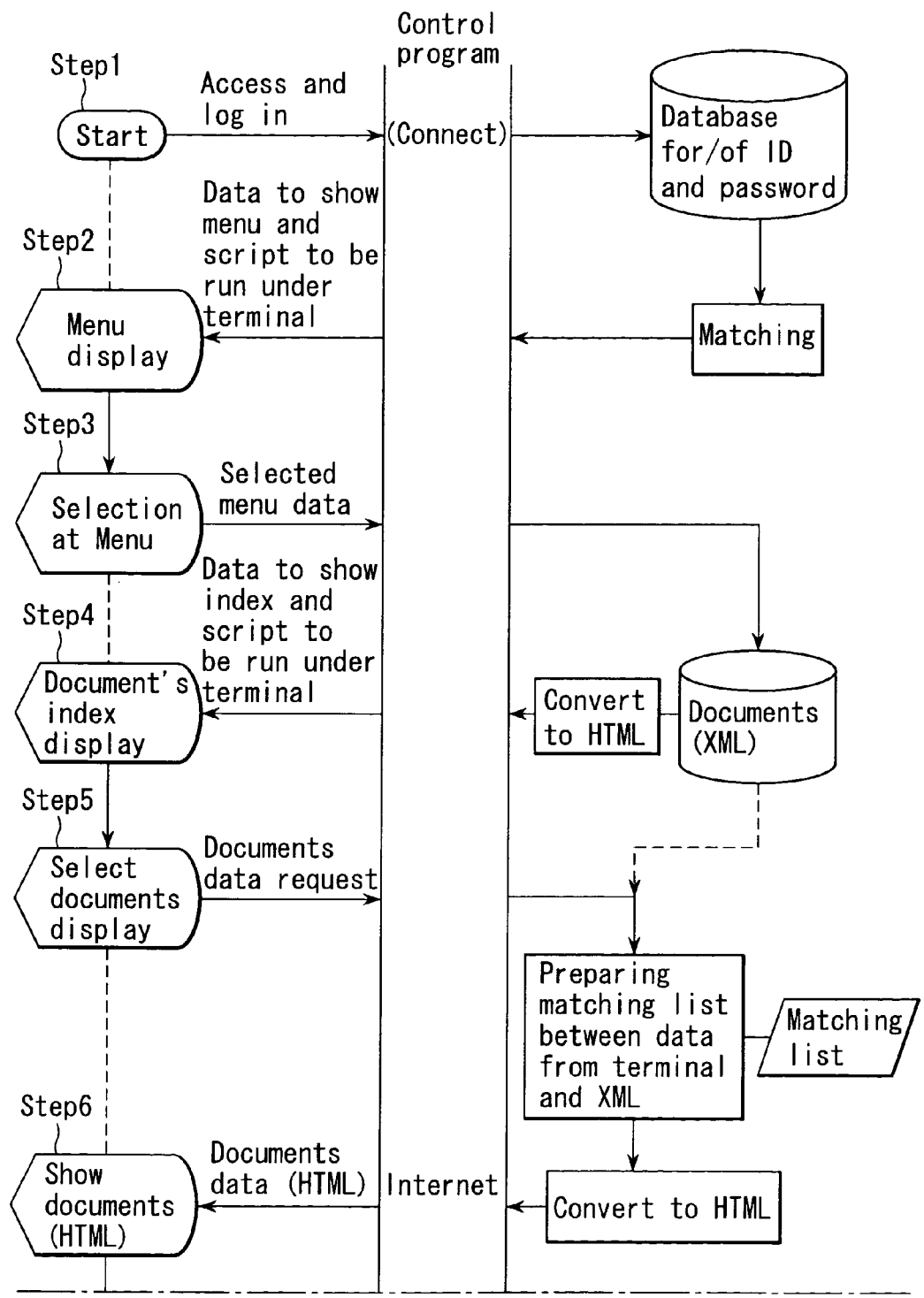
FIGS. 3A, 3B are flowcharts showing a processing procedure to be performed based on the document authoring system, and a constitution diagram of a data file system.
Figure 3B:
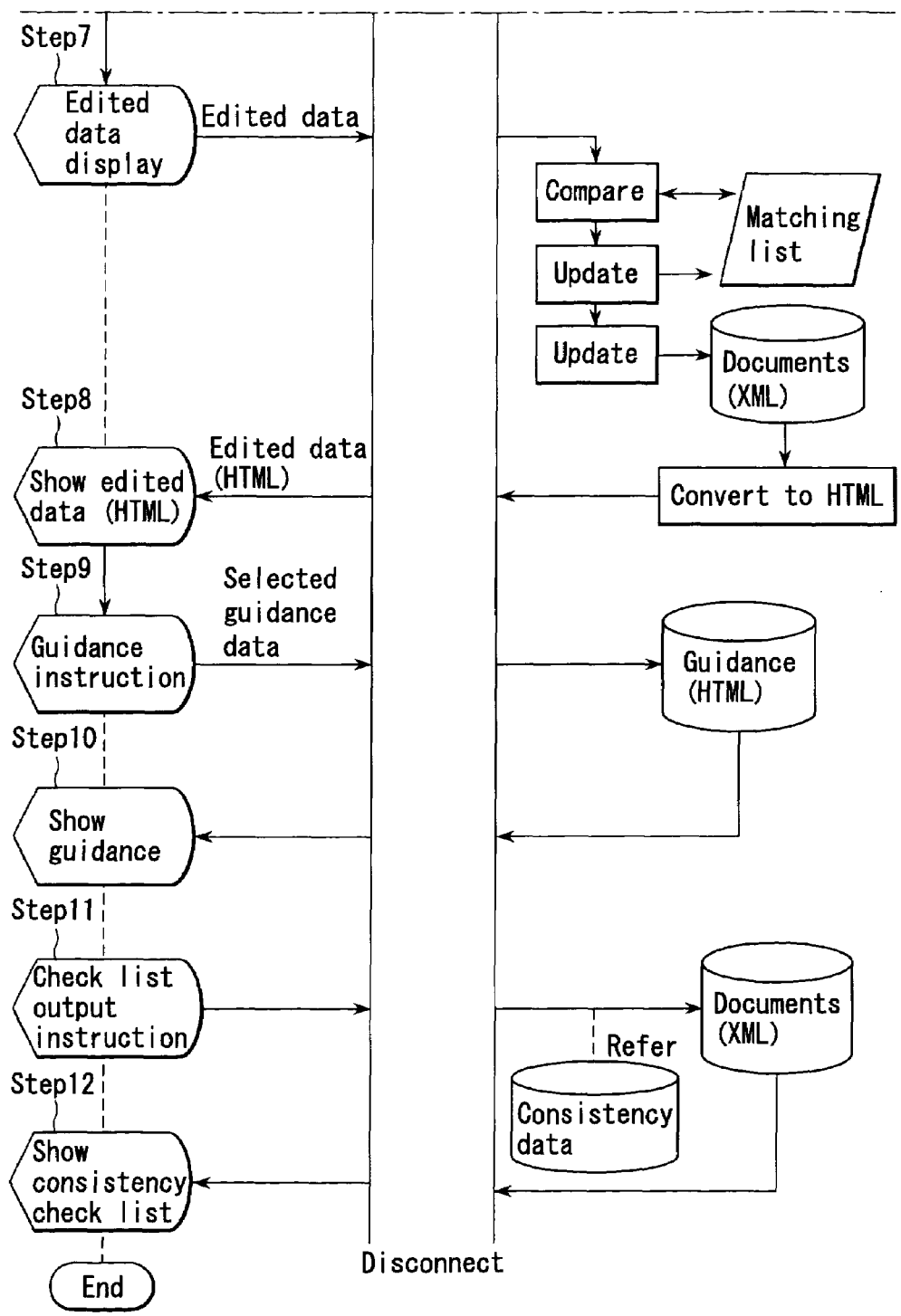

FIG. 2 shows a major function constitution related with the document authoring system of the present invention, and a flow of processing data by these functions.

This document authoring system includes an "authoring management program" for controlling/managing the preparation of documents including tables (e.g., a financial related disclosure filing document) in a software manner.

For details, for the authoring management program included in the document authoring system, output data sent as a change or predetermined command from the terminal devices 14, 16, 18, 20 of the client or from the server 12 is interpreted. Moreover, the program mainly includes: a data management function portion 12a which gives individual identification numbers to the output data, specifies a portion of the corresponding document to be edited based on the identification number, and updates (including adding/deleting) and processes the document of the XML format included in the server 12 to one-dimensionally manage the information in the document authoring system; editing means (editing management function portion 12b of the authoring management program) for editing document data (XML format data) 12f in accordance with predetermined information sent via the server 12 based on a client's request input from these terminal devices 14, 16, 18, 20; conversion means (data conversion function portion 12c of the authoring management program (CSS, XSLT, XML parser, DOM)) for converting the XML format data edited by the editing means into the HTML format data (i.e., data format for use in the terminal devices 14, 16, 18, 20 on the client side); publication means (publication function portion (Web browser) of the authoring management program) for releasing the HTML format data onto the Internet 10 in an accessible format; and means for supporting the input of the client's terminal devices 14, 16, 18, 20 (script function portion 12d of the authoring management program).

Moreover, the data management function portion 12a is set as the program so as to collate and update the corresponding part in the document based on matching lists 12e prepared corresponding to the identification number (described later in detail) concerning the editing object part of the document data designated by clicking/operating an image display symbol (described later in detail) which can be clicked/operated from the client terminal.

When the predetermined client terminal accesses the server 12 via the Internet 10 by a client's manual operation, the "authoring management program" is called from the document authoring system stationed in the server 12, and is set so as to execute the processing in a predetermined order.

Additionally, in the server 12, the document authoring system is managed with the data of the XML format.

Moreover, the data of the XML format is a simple text which does not have style definition. Therefore, for correct display on the user side via Web browser "not corresponding to XML" such as a usual browser for HTML, the data including the style definition is converted, and a source formed into the object is generated and sent by the function of the XML parser on which a document object model (DOM) is mounted.

Then, on the server 12 side, to transmit the data of this XML format to each client terminal, in consideration of the style definition by XSL, the text data of the XML format is controlled so as to be converted to the data of the HTML format by XSLT and transmitted.

The operation and preparation of the system according to the embodiment will next be described in general. Upon concluding the contract with the document filing company (client), the service provider company receives the document filed last year (data having the format of the filed document), performs predetermined correction for use in the input operation of this year, and stores the data (i.e., "filing company data") in the XML file format determined by the service provider company.

Moreover, these clients are informed beforehand of an exclusive-use ID and password for logging into the server 12 of the service provider company.

Only the client who acquires the ID and password and is authenticated can access the server 12 via the Internet 10 from their exclusive-use terminal devices, that is, the client terminals 16, 18, 20.

Subsequently, for example, the client who has accessed the server from the client terminal selects an arbitrary type of disclosure document, "securities report" in this case, from a menu screen displayed on the terminal. Then, the authoring management program of the document authoring system accepts the client's request to execute the processing, and calls filing document data (securities report data in this case) prepared beforehand in XML format.

It is to be noted that the terminal device 14 for exclusive use in the service provider company may also have a specification similar to that of the client terminals 16, 18, 20, and can similarly access the server 12 via the Internet 10 and via LAN in the company for the usual operation.

When the above-described operational preparations are completed, the operation of the system is first possible.

Next, the operation of the document authoring system will be described in detail with respect to "EDITS" as a concrete embodiment of the document authoring system for EDINET filing. When power is supplied to the resource (hardware) of the system, the server 12 constituting this system starts the predetermined authoring management program to start executing a series of processing steps as shown in a flowchart of FIGS. 3A, 3B.

This authoring management program first authenticates the ID and password. Then, an initial screen (log-in screen) for urging the client to input the ID and password is displayed (Step 1).

The client manually inputs the peculiar ID and password given to the server 12 of the service provider company beforehand in a correct order in order to log in the server 12 of the service provider company from the exclusive-use client terminal 14, 16, 18, or 20 via the Internet 10.

The system collates the input ID and password with registered contents of a predetermined database (database) for the ID and password. When a result of this collation is OK (access rights accepted), menu display information (described later in detail) for exclusive use in each client is displayed in the client terminals 14, 16, 18, 20 on the client side from the server 12, and "client processing software" can be used. That is, the exclusive-use software (described later in detail) for use in acceptance processing concerning menu and menu items is transferred (Step 2).

Transition of the screen will be described with reference to FIGS. 4 to 7B. First as the menu display information, a screen (EDITS main menu) shown in FIG. 4 is displayed in a terminal screen, a prompt is allowed to blink to prompt the client to select one filing document as a preparation object, and a selection operation is prompted (Step 3).

When the selection operation is completed, menu data selected by the client (in this case, data indicating the type of the filing document) is transferred, and contents list data (contents list generation information) of the corresponding filing company data (XML format data) is extracted based on judgment of the management program.

Additionally, since the extracted contents list data has the XML format, the data cannot correctly be displayed/output in the browser present on the client side as such. Therefore, here XSLT (i.e., software which converts XSL as a style sheet description language for XML) is used to convert the contents list data of the XML format into the HTML format. Thereafter, the contents list data converted into the HTML format, and client processing software are sent to any one of the client terminals 14, 16, 18, 20 on the client side from the server 12. Moreover, the contents list data is displayed in a format shown in (start screen: FIG. 5A) (Step 4).

Subsequently, the system prompts the client to select/input the predetermined item from the displayed contents list data (Step 5).

When the client's selection operation is completed, the authoring management program of the server 12 calls the filing document data (XML format) corresponding to the selected item, and the matching list of HTML and XML data is prepared. Subsequently, the matching list is stored in the server 12 for the purpose of collation. On the other hand, the data converted into HTML format is sent out to any one of the client terminals 14, 16, 18, 20 on the client side (Step 6).

It is to be noted that as necessary processing here, the matching list of the HTML format data to be sent out with the XML format data as original data is prepared beforehand on the server 12. In this matching list, a correspondence between the table and image display symbol is described. Every editing, the matching list is prepared in such a manner that both the client terminal and server can recognize the table. When the matching list is prepared in this manner, and when any one of the client terminals 14, 16, 18, 20 inputs/edits the HTML data in the next processing step, the correspondence of parts of editing including addition or deletion is clarified in both the client terminal and server. Additionally, the updating of the XML data of database on the server side, which is held as a "master file" to be shared, can be judged and performed.

Here, the selection operation by the client will be described in general. The "EDITS" according to the present embodiment has a first object to prepare, for example, the financial data related disclosure document here. Moreover, there are four major modes including the following functions:

"view" mode: finish of the document by HTML is displayed and viewed;

"input" mode: data is input;

"format setting" mode: formats such as a font size and margin are changed; and

"addition/deletion" mode: the table or text is added, copied, or deleted.

This EDITS has the following characteristics in order to solve the defects of the related art.

1. In EDITS, all the HTML data (sentence, table, image, and the like) displayed on the browser are selectable (clickable), and include individual identification numbers. The selectable mode differs with the data in some degree, but a relatively small image display symbol is used except the sentence. It is to be noted that the sentence includes hyperlink information as a clickable mode.

2. The user (client) who operates the terminal can access the data identified by the individual identification numbers through an operation of clicking the image display symbol easily seen by a human. That is, when the image display symbol displayed on the browser side is operated, specific data on the server 12 can be operated.

3. When the recognizing of the specific data is possible, it is first possible to designate "to insert the table after this sentence" or "to insert the sentence before the table".

4. In EDITS, the data is stored in the server in the XML format. The reason is that the data is held in the XML format and it is then possible to create meaning of the data.

In response to a request from the client terminal, the data of XML format is converted into the HTML format and sent out from the server 12. The XSLT is used to convert the XML into HTML. At this XSLT conversion time, the individual identification numbers are given to the clickable information (for details, see clickable information for each type of data).

In actuality, for example, to input the desired data, the client selects a frame from frames arranged in a screen upper edge of FIG. 5B, and clicks the "input" button on the right side of the "view" button designated up to now. With this instruction of the operation, for the screen, a rectangular input form is displayed in a region (numeric value input field) in which the numeric values can be input on the screen as shown in FIG. 6A. Moreover, the numeric value data input is prompted so that the numeric values can be input in the input field.

Figure 6B:
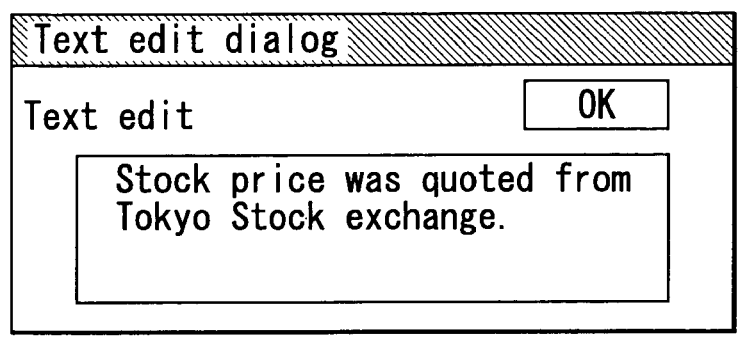

Furthermore, for example, when the desired sentence is to be described in a lower part of the input field, and the desired position is doubleclicked, a sub window is further displayed as a text editing dialog in the right of the screen as shown in FIG. 6B, and the client is prompted to perform a data input operation for text editing. Additionally, for a region (character input field) in which characters can be input, a variable-length region which can be displayed on the screen is prepared, and the client is prompted to perform a character data input operation for text editing.

In this manner, for a sentence part of the filing document, hyperlink is basically automatically set. In an editing operation, a click/double click operation is freely performed with a mouse as described above. Thereby, the client displays the sub window beside the sentence part being edited so that the input is possible, and the editing is set such that various documents can be edited.

Moreover, a case will generally be described in which the format is changed with respect to the input data. When the client wants to change the format, the client clicks/operates the "format setting" button from the frames arranged in the upper edge of FIG. 5A. By this operation, for the screen, as in the format setting mode time of FIG. 7A, various image display symbols which can be clicked/operated are displayed in corresponding predetermined positions. These image display symbols are sorted by various determined colors and shapes in accordance with the object data. For example, the whole document is indicated by a slightly large green symbol, a table is indicated in orange, a column is indicated in yellow, and a cell is indicated in gray.

Figure 7B:
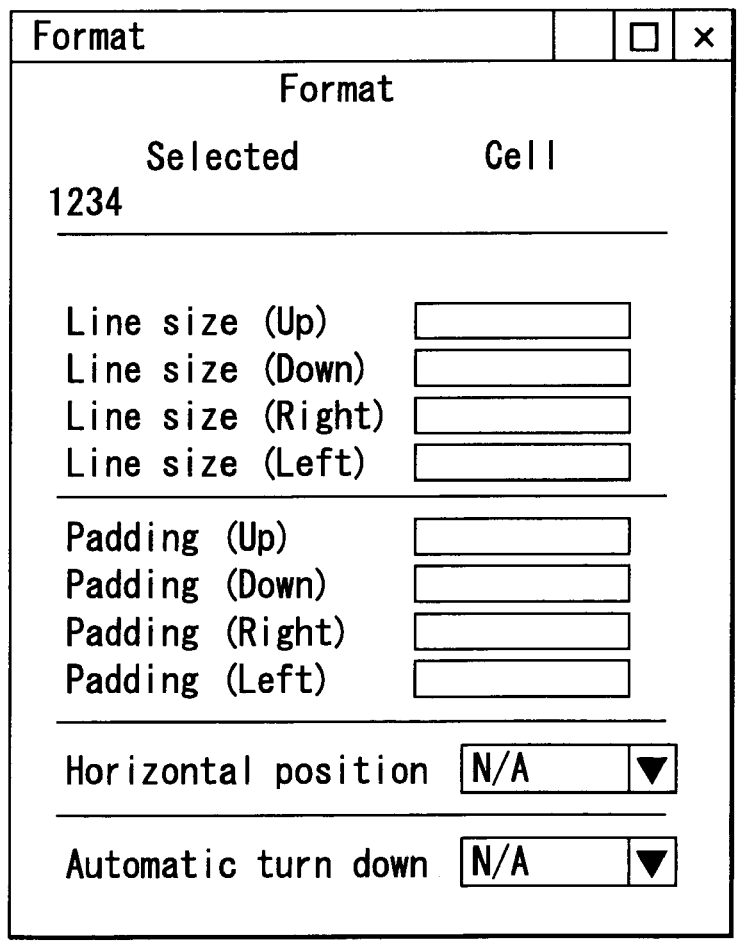

When these image display symbols are clicked, the dialog (dialog of the clicked cell in FIG. 7A) is displayed in accordance with the object data as shown in FIG. 7B. By the click operation of the dialog, the client can transmit object data of the format change and change contents (e.g., the change of the font or the setting of rules) to the server 12.

Following Step 6, the data edited (input/changed) herein is transferred to the server 12 in conformity to HTTP protocol. Subsequently, after the authoring management program collates the data with the matching list prepared in Step 5, information on document editing, indicating the data of the XML format to be updated, can be obtained. Therefore, update processing of the filing document data is executed based on the information (Step 7).

Thereafter, after the updated XML data is similarly converted into the HTML format as described above, the data is sent out to any one of the client terminals 14, 16, 18, 20, and document data content is displayed as the edited document (Step 8).

Moreover, a series of processing steps may be ended here as desired.

Subsequently, when the client selects/designates "guide display" (from the main menu of EDITS (see FIG. 4)), the information indicating the file being edited is transmitted to the server 12 (Step 9).

The server 12 processes the information by the authoring management program, extracts guidance information concerning the file being edited from predetermined guide data database, and sends out the data to any one of client terminals 14, 16, 18, 20. Subsequently, the guide display is performed (Step 10).

Moreover, when the client selects/instructs "output of consistency check table" from the main menu of EDITS (see FIG. 8), the authoring management program extracts the predetermined data from the filing document data database with reference to consistency data prepared beforehand (Step 11), and the consistency check table is displayed as a result of consistency check as shown in FIG. 8 (Step 12).

In summary, the document in XML format stored in the server 12 is displayed from the client terminals 14, 16, 18, 20 through the browser disposed in each terminal, auxiliary operation of the script sent from the server 12 is obtained, and it is possible to designate a purpose of editing.

The editing purpose is designated through the individual identification numbers and image display symbols attached to the HTML data by the server 12. That is, the client terminal user clicks/operates the desired image display symbol to specify the data to which the individual identification number is attached.

The server 12 which has obtained the designation from the browser recognizes the individual identification number by the authoring management program, and collates the data with the matching list prepared at a data sending time to specify a changed part. After specifying the changed part, the editing is executed by the function of the editing portion of the authoring management program.

With respect to the above-described execution result, the individual identification number is given (attached) anew, and the result is converted into the HTML format, and sent to the browser together with the script.

By the above-described series of flow, the client terminal user designates the data by the HTML format with the image display symbol without directly inputting the HTML data, so that the XML format data on the server 12 can be operated.

Figure 20:
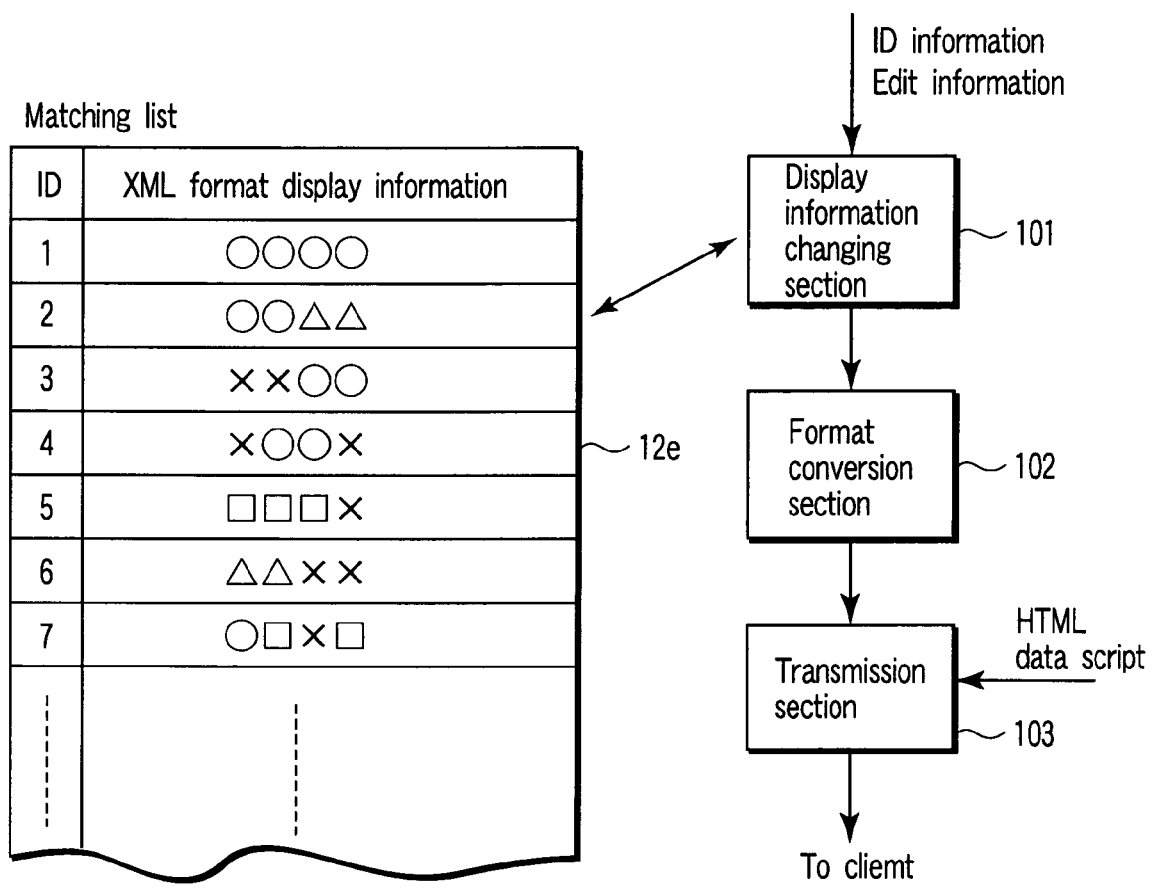
FIG. 20 shows a matching list and a function block diagram of a server.

FIG. 20 shows a matching list and a function block diagram of a server.

As shown in FIG. 20, for a matching list 12e, identification information indicating a plurality of items on a web screen is associated and stored with display information of an XML format indicating a content to be displayed in the item corresponding to the identification information.

Moreover, a server computer includes a display information changing section 101, format conversion section 102, and transmission section 103.

The display information changing section 101 receives the identification information indicating an item constituting an edition object, which is transmitted from a client computer, and edit information indicating an edition content of the item constituting the edition object. Moreover, the section uses the received identification information as a key to acquire the display information of the XML format from the matching list 12e, and changes the acquired display information of the XML format so as to obtain the edition content indicated by the received edit information. Moreover, the section attaches new identification information to the display information of the changed XML format, and stores the changed display information of the XML format in the matching list 12e together with the newly attached identification information.

The format conversion section 102 converts the display information changed by the display information changing section 101 into the display information of the HTML format.

The transmission section 103 adds and transmits the display information converted by the format conversion section 102 and the corresponding identification information to a client together with a script (program), e.g., a Java script.

It is to be noted that the client transmits the identification information indicating the item constituting the edition object of a document displayed on the web screen as designated by a user, and the information indicating the edition content of the item constituting the edition object to the server, when the user designates the item constituting the edition object of the document displayed on the web screen, and edition content. This operation is realized by the script transmitted from the server.

FIGS. 9A, 9B show examples (Table Example 1) of the table of the HTML format prepared by the document authoring system according to one embodiment of the present invention. Additionally, this is a display image in the client terminal.

Here, a case will generally be described in which necessary information of various documents are input as shown and an arbitrary document is prepared and then changed.

Table Example 1 shows "document concerning lease transaction", Table Example 1 further includes a table 11, and an acquisition value equivalent amount is described in an item 11a. This document is displayed using the HTML format on the browser by the document authoring system. Moreover, on the browser, the HTML format may also be used to arbitrarily include another table (not shown) in the table 11.

As described above, for the financial data related disclosure document, the table is edited in a "nested" state as described above in many cases. In this case, a processing method of preparing and attaching a table part to be included in the table with the image has heretofore been conventional, and subtle control has been difficult in the processing of a so-called "table in table" in "Word" of Microsoft Co., Ltd. On the other hand, in the present invention, the table is inserted into the table in the "nested state" substantially without any restriction (described later in detail). Moreover, in EDINET electronic disclosure of the securities report as guided by the Financial Service Agency in Japan, graphic data is requested not to be used if possible. Therefore, the present invention is more preferably suitable for the electronic disclosure, because the table in table can easily be processed.

Next, FIG. 10 shows an example of a part of a balance sheet. As shown in the drawing, for the document authoring system of the present invention, the table can be prepared in a tree shape (hierarchical manner). This tree-shaped data structure corresponds to a data (node) structure in the XML format. To edit the data structure, a circle mark as the image display symbol (hereinafter referred to also as the "image") in Table Example 2 is applied as a graphical user interface, and the client clicks/operates the symbol. That is, it is possible to insert a predetermined table (standard table) or a table in which the number of rows/columns can freely be set before/after an insertion target selected by clicking the circular image.

For the standard table, a pattern is prepared in accordance with the edited document, and therefore only the document for appropriate use is displayed. The table to be inserted can be previewed in the browser. For example, in Table Example 1, a region represented by an image 24 in the table includes buildings and structures, account receivable "2,500" as a previous-period numeral, and account receivable "2,800" as a current-period numeral. When the image 24 disposed in the left upper portion is clicked/operated with the mouse (not shown), the client can perform movement, copying, or deletion concerning the above-described region.

Moreover, the region represented by an image 23 in the table includes three regions including: a region of tangible fixed assets, previous period, and current period; a region of a machinery, previous period, and current period; and a region of buildings and structures, previous period, and current period. Therefore, when the image 23 disposed in the left upper portion is clicked/operated, the client can similarly perform the movement, copy, or deletion concerning the three region.

Thereafter, in an image 26, a region of stock issuance expenses, previous period, and current period can be operated. In an image 25, a region of deferred assets, previous period, and current period, a region of a business commencement, previous period, and current period, and a region of the stock issuance expenses, previous period, and current period can be operated.

Moreover, in an image 21, 16 items including a region of current assets, previous period, and current period to the region of the stock issuance expenses, previous period, and current period in the table can be operated.

A case will next be illustrated/described in which the row or column is inserted into the table prepared by the document authoring system with reference to FIGS. 11A, 11B. Table Example 3 prepared with the HTML format data by the document authoring system is displayed as shown in FIG. 11A. To insert one row in Table Example 3, the image display symbol of row 30 displayed in a part into which the row is to be inserted in Table Example 3 of FIG. 11B is clicked on the browser, and a row 32 can be inserted as shown.

Moreover, to insert one column, for example, right to "Machinery" column, an image display symbol 31 displayed in a part (previous column in this case) into which the column is to be inserted in Table Example 3 is clicked on the browser, and a column 33 can newly be prepared and inserted as shown.

In this manner, on the browser, for the table prepared with the data in HTML format, the row or column can freely be inserted as in table calculation software (e.g., "Excel" of Microsoft Co., Ltd.).

FIGS. 12A, 12B, 13A, 13B are explanatory views showing an example in which a plurality of cells are merged (combined/edited).

First as shown in FIG. 12A, a cell 40 as a start point of a cell group to be merged and a cell 41 as an end point are designated, and four cells can be merged (combined/edited) as shown in FIG. 12B.

Moreover, as shown in FIG. 13A, a cell 42 as a start point of columns to be merged and a cell 43 as an end point are designated, and four columns including eight cells can be merged (combined/edited) as shown in FIG. 13B.

As described above, for example, in a securities transaction law in Japan, the electronic disclosure by the data of the HTML format is admitted. However, with the application of the embodiment of the present invention in which the data in HTML and XML formats are combined, while the display of the data in HTML format to be filed is confirmed, the preparation operation can be performed.

Moreover, in the present embodiment, since the data is held in XML format, it is possible to create the meaning of the data, and the consistency check among the data is possible. For example, a core of the financial data related disclosure document is constituted by financial statements, and financial statement data is cited in any part of the disclosure document. When a definition document of mutually associated XML format data including financial statements data is prepared beforehand, the consistency among the specific data can be checked.

Furthermore, for example, the core of a financial related disclosure document is constituted of financial statements, but the financial statements are prepared following the same rule in the securities transaction law and a disclosure system of a brief note in Japan. The preparation timing of the brief note is earlier, and therefore the financial statements data input to the brief note is preferably transferred to the financial report or semiannual report as such.

In the present invention, this format is realized by the combination of the HTML and XML formats. Moreover, as an incidental effect, the problem of the consistency among the prepared disclosure documents can also be solved.

Moreover, the browser is used as on-line "data sharing input means", and thereby the user (client) which can access the Internet 10 can access the data from anywhere.

Many parties concerned such as disclosure document filing company, audit corporation (certified public accountant), and printing company are usually engaged in the preparing of an account settlement disclosure document. However, when the Internet 10 is used, newest data can be accessed from anywhere anytime, and labor for preparing the disclosure document can largely be saved.

Furthermore, the XML data on the server 12 is edited with HTML on the browser of the client terminals 14, 16, 18, 20, and the edited result is returned to the server 12 again. In this case, a number which can uniquely be identified is granted to an element as a processing object in the HTML data transmitted to the browser of the client terminals 14, 16, 18, 20 from the server 12. It is to be noted that in the display on the browser, the number is displayed as the image display symbol. The client who uses the client terminal 14, 16, 18, or 20 designates the above-described image display symbol to designate the processing object.

Moreover, for the transmission to the server 12 from the client terminals 14, 16, 18, 20, only the changed processing object is transmitted, and a data transmission amount can be reduced.

Furthermore, for the input, display attribute, and addition/deletion with respect to one element, four modes of "view", "input", "format setting", and "addition/deletion" are included in so-called "each data", and thereby the input field and image display symbol are set with respect to the element selectable in each mode. By this processing, it is possible to control the number of image display symbols displayed in one screen. As a result, a screen which can easily be understood by the client can be constituted.

Additionally, to store the screen position at a mode change time, when the mode is changed for the scrolled screen being displayed, a new page is sent from the server 12, and therefore the top of the page is constantly displayed. Therefore, even when the mode is changed, the presently displayed screen is displayed as such. Therefore, at an execution time of the mode change, the position of the page being displayed is recorded, transferred to the server 12, and scrolled into the same position at the next page display time.

Thereby, the client does not have to click the mouse (not shown) to grasp the present position. Even when the mode is changed and a new page is sent from the server 12, the same screen display position can be secured.

Furthermore, to clarify the parts of the editing, attribute change, and addition/deletion, the input is made in the browser. When the server 12 returns a response, the top of the page is displayed. Therefore, an excess operation is necessary for returning a page which has heretofore been required to be scrolled to the input part. Moreover, labor and time have heretofore been required for searching for the part to be changed. However, in the present invention, the background of the changed item is changed with a timer, the changed part information is transferred from the server 12, and the part is moved to the corresponding part at page display time. Thereby, the screen is scrolled to a position in which the changed item is displayed, the changed part is displayed in a blinking manner, and the client therefore easily grasps the changed part.

As described above, in the document authoring system according to the present invention (i.e., the whole document authoring apparatus and method), a large number of parties concerned share a one-dimensionally managed master file via the Internet, browse the desired document for filing (e.g., in HTML format), access the master file itself, and can perform editing operations such as new preparation/change/addition/deletion of the document.

Furthermore, there is provided a function of displaying guide information for a part being prepared, such as the ground provision and similar preparation example in a guidance manner during the editing such as the preparation concerning the sentence in the document. Therefore, when the information is referred to, the editing operation becomes efficient. Moreover, it can automatically be verified whether or not the consistency is kept among the numeric values with respect to the major data of the document, and therefore inconsistency is hardly generated in the whole document.

It is to be noted that as a matter of course a security countermeasure against improper access or data update is appropriately taken.

The embodiment has been described above, and a plurality of modification examples of this embodiment will next be described.

In the above embodiment, the document authoring system has been described in terms of an example of the document for EDINET filing (published document) requested to be prepared by the public company. Additionally, the document authoring system of the present invention may be applied to the following documents as the object to be handled, and can be modified/carried out as follows.

Examples of the document which can be handled include a name card, accounting slip, business form, account settlement advertisement, bill, entry papers, article (newspaper), book draft, magazine draft, and various application forms and notifications related with an electronic government.

MODIFICATION EXAMPLE 1

For example, the present invention may also be modified/carried out as follows, and an effect equal to that of the above-described embodiment can be expected. That is, the present invention can be applied as a system in which "newspaper, book, and magazine" are prepared and edited in the constitution shown in FIG. 14 in the same manner as in the above-described "financial data related document authoring system".

Authors A/B/C together with an editor D are making preparations for authoring a book (not shown). The authors A/B/C and editor D use the terminal devices 20, 18, 16, 14 connected to the Internet 10, and access the draft of a book E on the publishing company server 12. Each of the terminal devices 20, 18, 16, 14 of the authors A/B/C and editor D include the browser as browsing software of the Internet 10.

Therefore, the authors A/B/C and editor D can use the system of the present invention to perform a cooperative preparation/editing operation of the draft regardless of word processor software.

When the authors A/B/C and editor D log into this document authoring system from each terminal and designate the "draft" as the editing object, the screen is displayed as shown in FIGS. 15A, 15B. The authors A/B/C and editor D call the editing screen through the Internet 10, designate the list of contents (Chapter 2 Regarding Financial Statements) displayed on the left side of the screen, and call the document as the editing object. Since the document is first displayed as shown by FIG. 15A, the editing operation can be performed with respect to this draft part.

The processing in the browser which only has the browsing function has been essentially performed as described above. However, when the document authoring system of the present invention is used, it is possible to freely edit the draft displayed in the browser and change the layout.

FIG. 15A shows a "view" mode in the document authoring system. In the same manner as in the above-described "financial data related document authoring system", the editing screen includes the mode displayed in a screen upper part. When the image display symbol of the screen upper part is clicked, the "view" mode can be changed as follows.

FIG. 15B shows a screen layout in which the mode is changed to the "input" mode. When the mode is changed in the same manner as in the "financial data related document authoring system", clickable data is sent from the server 12, and all text/numeric value data can be clicked in this state.

Figure 16A:
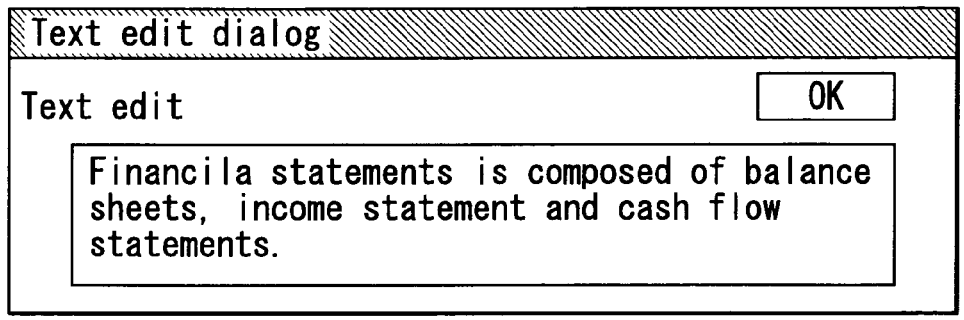

For example, when the first sentence starting with "Financial statements . . . " is clicked in the input mode of FIG. 15B, the sub window is started, and an editable state is obtained as shown in FIG. 16A.

Similarly, all the text and numeric values can be edited.

It is to be noted that the basic mechanism is the same as the above-described "financial data related document authoring system" of the embodiment, and the layout is changed in an "addition/deletion" mode.

When the "addition/deletion" button is further clicked, the screen of FIG. 16B of Modification Example 1 is displayed.

Different from the above-described "input" mode shown in FIGS. 6A, 6B, an orange image display symbol is displayed in data of a table format (balance sheet in this case) in the "addition/deletion" mode.

In the same manner as in the "financial data related document authoring system" of the above-described embodiment, the author A/B/C or editor D can click this orange-colored image display symbol in this example to perform the copy/deletion/movement of the table such as the designated balance sheet.

The following effect is obtained according to Modification Example 1.

1. Since the author and editor can constantly proceed with the operation referring to the same draft in real time, the communication between the author and editor becomes smooth.

2. Since there is always one original draft, the mix-up of the draft does not occur.

3. Since the authors can browse mutual burden shares, terms and expressions are easily unified.

4. Since the prepared draft has the XML format, the conversion into various formats (HTML, PDF) is easily performed using XSLT. Therefore, simultaneously with the output onto paper, the publishing (DTP, etc.) can easily be performed on the Internet 10.

Therefore, according to Modification Example 1, the effect equal to or more than that of the above-described embodiment can be anticipated.

MODIFICATION EXAMPLE 2

Moreover, the present invention can similarly be modified and applied also to the following "business form". Furthermore, the effect equivalent to that of the above-described embodiment can be anticipated.

Here, the "business form" indicates documents which have standard formats for use in business, such as an estimate, invoice, bill, and receipt.

It will be illustrated that the present modification example is also effective for preparing this business form block copy.

Figure 17:
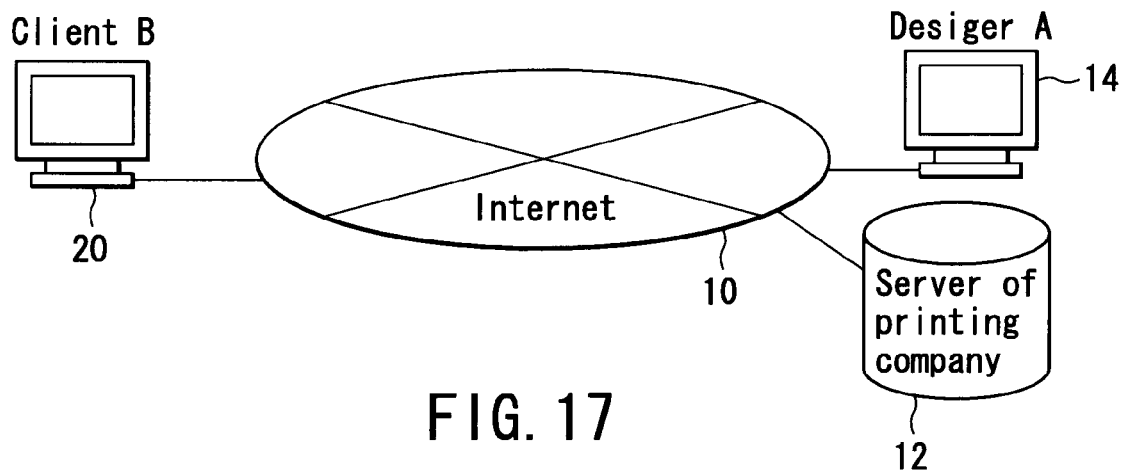
FIG. 17 is a system constitution diagram showing a constitution as Modification Example 2 in which the present invention is applied to the preparation and editing of a "business form block copy"
Figure 19A:
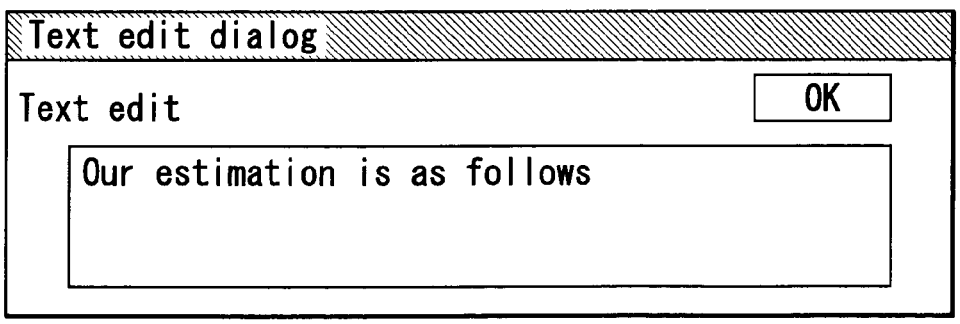

According to FIG. 17, the printing company and designer A use the document authoring system of the present invention, and designs the business form block copy of the bill, and the like in response to a request of requester B. The terminal devices 14, 20 of designer A and requester B include the browser as the browsing software for the Internet 10.

Designer A and requester B can use this document authoring system to perform the cooperative preparation/editing operation of the business form block copy regardless of the word processor software. For details, designer A first uses the terminal device 14 connected to the Internet 10 to access the business form block copy on the publishing company server 12.

The terminal device 14 or 20 logs into the document authoring system, and designates "draft preparation". Then, a screen is displayed as shown in FIG. 18A. Designer A calls the editing screen via the Internet 10, designates the list of contents displayed on the left side of the screen, calls the draft as the editing object, and can perform the editing operation.

For each list of contents, a standard business form example (estimate example) has already been prepared, and designer A presents these samples to requester B via the browser, and can proceed with the operation.

The screen shown in FIG. 18A is in the "view" mode in this system, and a mode in which this editing screen is displayed in the screen upper part is disposed in the same manner as in the "financial data related document authoring system". This "view" mode of FIG. 18A can be changed to another mode, when the button in the screen upper part is clicked.

Figure 18B:
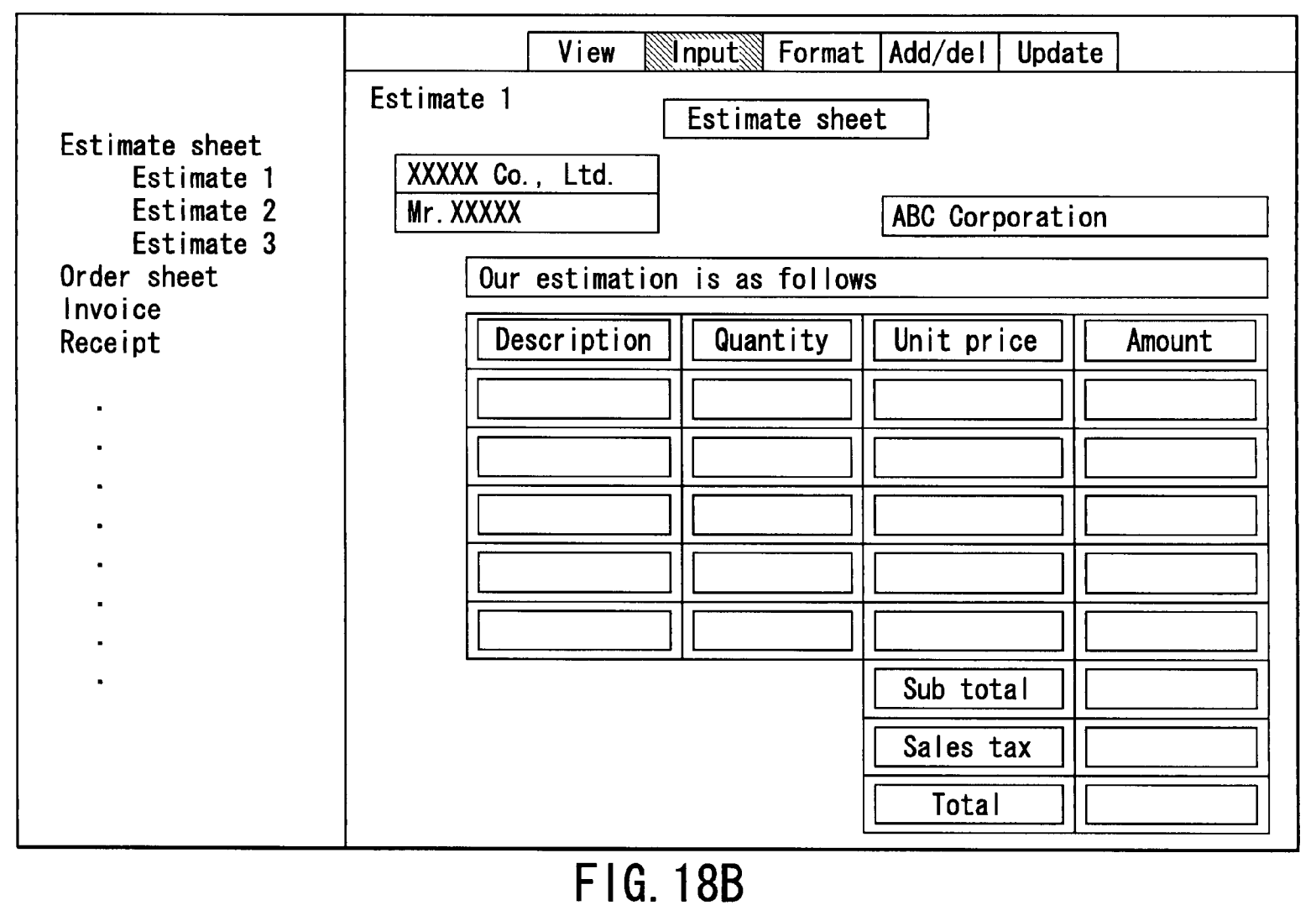

FIG. 18B shows a screen whose mode is changed to the "input" mode. When the mode is changed in the same manner as in the "financial data related document authoring system", the clickable data is sent from the server 12. Therefore, all the text/numeric value data can be clicked in this state.

For example, when a sentence starting with "Our estimation . . . " is clicked in the "input" mode of FIG. 18B, the sub window is started, and an editable state is obtained as shown in FIG. 18B. All the text/numeric value can similarly be edited.

This basic mechanism is the same as the "financial data related document authoring system". For example, the text editing dialog is displayed in the sub window of FIG. 19A, and the desired text editing is possible.

Moreover, the layout is changed in the "addition/deletion" mode. For details, when the "addition/deletion" button is clicked, a screen of FIG. 19B is displayed.

Different from the input mode of FIG. 18B, the orange-colored image display symbol is displayed in the data of the table format (the balance sheet in this case) in the "addition/deletion" mode. The designer A clicks the orange-colored image display symbol and can copy/delete/move the designated table in the same manner as in the above-described "financial data related document authoring system".

The following effects are obtained according to Modification Example 2.

1. Since the designer A and requester B can constantly proceed with the operation referring to the same draft in real time, the communication between the designer A and the editor of the printing company becomes smooth.

2. The designer A can perform the operation without selecting the place as long as the environment can be connected to the Internet 10.

3. Since there is always one original block copy, the mix-up of the block copy does not occur.

4. Since the prepared block copy has the XML format, the conversion into various formats (HTML, PDF) is easily performed using XSLT. Therefore, simultaneously with the output onto paper, the publishing can easily be performed on the Internet 10.

OTHER MODIFICATION EXAMPLES

Additionally, for example, for the XML conversion program with style definition, a CSS relating to the conversion and display is disposed as first conversion means, and XSLT, an XML parser, and DOM are disposed as second conversion means. When the present invention is modified/carried out in this manner, the display accompanying mutual communication between the terminal device and server may also be possible.

It is to be noted that in the document authoring system of the present invention, the present invention can also be modified/carried out not only for the XML for current use in the Internet field but also for description languages derived from this format, such as XHTML and XBRL.

Additionally, the present invention can variously be modified/carried out without departing from the scope.

Finally, the items achieved by the system of the present invention are arranged as follows.

The data on the browser is synchronized with the data of the server by the identification number. The identification number is replaced/represented with the image display symbol (or hyperlink) which differs with the type of data.

As a result, when the client merely operates the easy-to-understand image display symbol, it is possible to substantially freely process the XML data on the server. That is, it is possible to easily move/delete/copy the object selected on the browser by a "man/machine interface" which can easily be understood visually and instinctively.

That is, when the document authoring system according to the present invention is used, the client visually confirms the document, for example, having the EDINET filing format in the screen, shares the data concerning the document among the parties concerned via the Internet 10, and can prepare the document with a simple operation. Moreover, it is also possible to publish the document.

At this time, in the document authoring system, to edit the associated data based on the request from the client terminals 14, 16, 18, 20, the client is not aware of a different in the data format to be handled (XML or HTML format), and the speedy and accurate preparation/editing operation via the Internet 10 is easily realized with an enhanced efficiency.

As described above, according to the present invention, there can be provided the document authoring system and authoring management program in which the filing documents such as the disclosure document can easily be prepared using the browser and can be accessed on Web page.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A document authoring system comprising:
   a server; and
   a client connected to the server via a network, the client comprising:
   means for displaying a plurality of objects to be edited and a plurality of identification information corresponding to the objects to be edited, respectively, on a web screen, wherein the plurality of objects and the plurality of identification information are described in a first language; and
   means for transmitting the identification information corresponding to the object to be edited, designated by a user, to the server;
   wherein the server comprises:
   a matching list in which the plurality of identification information corresponding to the objects to be edited are stored in association together with the plurality of display information to be displayed, wherein the plurality of display information to be displayed are described in a second language;
   means for converting the display information described in the second language, stored in the list, which corresponds to the identification information transmitted from the client to the display information described in the first language; and
   means for transmitting the identification information corresponding to the object to be edited transmitted from the client and the converted display information,
   wherein the client further comprises:
   means for displaying the converted display information transmitted from the server in an edit window, according to a type of the object to be edited, for editing and converted display information.

2. The document authoring system according to claim 1, wherein the means for transmitting in the client further transmits an edit information indicating an edition content of the object to be edited by the user;
   the server further comprising means for changing the display information, stored in the matching list, corresponding to the identification information transmitted from the client; and
   the means for converting in the server converts the changed display information described in the second language, stored in the matching list, which corresponds to the identification information transmitted from the client to the display information described in the first language and the means for transmitting in the server transmits the changed display information.

3. The document authoring system according to claim 2, wherein the first language format is HTML.

4. The document authoring system according to claim 2, wherein the second language format is XML.

5. The document authoring system according to claim 2, wherein the edit information indicates that a new list is added.

6. The document authoring system according to claim 1, wherein the plurality of identification information corresponding to objects to be edited are displayed, on the web screen, as image symbols which can be clicked, respectively, and
   the means for transmitting in the client transmits the identification information corresponding to the object to be edited when the image symbol thereof is clicked.

7. The document authoring system according to claim 2, wherein the edit information includes information indicating a format of the object to be edited.

8. The document authoring system according to claim 2, wherein the edit information includes character information of the object to be edited.

* * * * *